United States Patent
DiEsposti et al.

(10) Patent No.: US 7,492,314 B2
(45) Date of Patent: Feb. 17, 2009

(54) USER EQUIPMENT NAVIGATION SOLUTION WITH POSITION DETERMINATION OF A NAVIGATION SIGNAL REFLECTOR

(75) Inventors: Raymond S. DiEsposti, Lakewood, CA (US); Jonathan A. Tekawy, Newport, CA (US); Clifford W. Kelley, Rancho Palos, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/566,144

(22) Filed: Dec. 1, 2006

(65) Prior Publication Data

US 2008/0129587 A1 Jun. 5, 2008

(51) Int. Cl.
*G01S 1/00* (2006.01)
*G01S 3/02* (2006.01)
*H04B 7/185* (2006.01)

(52) U.S. Cl. .................. 342/357.06; 342/353; 342/453
(58) Field of Classification Search .............................
342/357.01–357.017, 353, 453
See application file for complete search history.

(56) References Cited

U.S. PATENT DOCUMENTS

| | | | | |
|---|---|---|---|---|
| 4,746,924 | A | * | 5/1988 | Lightfoot ................... 342/453 |
| 5,187,485 | A | | 2/1993 | Tsui et al. |
| 5,963,582 | A | * | 10/1999 | Stansell, Jr. ................. 375/148 |
| 6,232,922 | B1 | | 5/2001 | McIntosh |
| 6,362,782 | B1 | * | 3/2002 | Greenspan et al. ........... 342/453 |
| 7,161,532 | B2 | * | 1/2007 | Gomm ................... 342/357.02 |
| 7,269,387 | B2 | * | 9/2007 | Wolf et al. ................. 455/11.1 |
| 2002/0087450 | A1 | | 7/2002 | Reddy |
| 2003/0222819 | A1 | * | 12/2003 | Karr et al. .................... 342/457 |
| 2005/0168381 | A1 | * | 8/2005 | Stephens .................... 342/146 |
| 2006/0025158 | A1 | * | 2/2006 | Leblanc et al. ........... 455/456.2 |

OTHER PUBLICATIONS

PCT Intl Search Report and Written Opinion for Application No. PCT/US2007/086053, dated Nov. 11, 2008, 15 pgs.

* cited by examiner

*Primary Examiner*—Thomas H Tarcza
*Assistant Examiner*—Harry Liu
(74) *Attorney, Agent, or Firm*—Lee & Hayes, PLLC (57) ABSTRACT

User equipment navigation solution with position determination of a navigation signal reflector methods and systems are described. In an embodiment, navigation signals transmitted from global positioning system (GPS) platform(s) can be received at a GPS-enabled receiver as direct navigation signals and reflected navigation signals. The direct navigation signals can then be isolated from the reflected navigation signals. Receiver range measurements can be determined from the direct navigation signals which are received via direct signal paths from the GPS platform(s), and a navigation solution of the GPS-enabled receiver can then be resolved from the receiver range measurements. Similarly, reflector range measurements can be determined from the reflected navigation signals which are received via reflected signal paths from a signal reflector, and a position of the signal reflector can then be resolved from the reflector range measurements at the GPS-enabled receiver.

16 Claims, 4 Drawing Sheets

USER EQUIPMENT NAVIGATION SOLUTION WITH POSITION DETERMINATION OF A NAVIGATION SIGNAL REFLECTOR

TECHNICAL FIELD

The present disclosure relates to Global Navigation Satellite System (GNSS) or Global Positioning System (GPS) navigation signals, and more specifically to user equipment navigation solution with position determination of a navigation signal reflector utilizing direct navigation signals and reflected navigation signals.

BACKGROUND

The Global Positioning System (GPS) is a satellite-based system of navigation satellites that is relied upon to provide accurate position, velocity, and time (PVT) information to GPS-enabled receivers, particularly for military aircraft and weapon systems applications. Civilian applications rely on GPS PVT information to be highly accurate for aircraft, auto, and marine navigation as well as for surveying and other PVT information applications. A GPS-enabled receiver (also commonly referred to as "user equipment") can acquire and lock on to synchronized ranging signals (navigation signals) broadcast from the GPS satellites, determine ranging measurements to the satellites, and triangulate to solve for position, velocity, and time (PVT).

A common problem for GPS user equipment is reflected navigation signals that are broadcast from the GPS satellites and then reflected off of other objects, such as buildings, large metal structures, an isotropic reflector, and the like. These reflected navigation signals are commonly referred to as "multipath" signals because they are reflected before being received, rather than being received as direct navigation signals via a direct path from a satellite to the GPS user equipment. When a GPS-enabled receiver locks on to reflected navigation signals and uses the multipath signals to determine the ranging measurements, a navigation error is introduced into the GPS user equipment PVT solution which can significantly degrade navigation accuracy.

Unlike a conventionally-shaped building, an isotropic reflector may be partially or fully spherical and can reflect several or even all of the navigation signals broadcast from the GPS satellites. The reflected navigation signals from an isotropic reflector that are received by GPS user equipment at some distance from the reflector will be delayed by an equal amount of time relative to the corresponding direct path navigation signals phase incident at the reflector, where the time delay is equal to the distance between the reflector and the user equipment divided by the speed of light.

Techniques currently exist to mitigate the effects of GPS multipath (reflected navigation signals), such as improved GPS user equipment antenna designs and signal processing methods. However, traditional GPS multipath techniques simply try to eliminate multipath reflections and/or reduce the error associated with reflected navigation signals which are considered corrupt navigation signals to be eliminated.

SUMMARY

This summary introduces simplified features and concepts of user equipment navigation solution with position determination of a navigation signal reflector which are further described below in the Detailed Description. This summary is not intended to identify essential features of the claimed subject matter, nor is intended for use in determining the scope of the claimed subject matter.

In an embodiment of user equipment navigation solution with position determination of a navigation signal reflector, navigation signals transmitted from Global Positioning System (GPS) platform(s) can be received at a GPS-enabled receiver as direct navigation signals and reflected navigation signals. The direct navigation signals can then be isolated from the reflected navigation signals. Receiver range measurements can be determined from the direct navigation signals which are received via direct signal paths from the GPS platform(s), and a navigation solution of the GPS-enabled receiver can then be resolved from the receiver range measurements. Similarly, reflector range measurements can be determined from the reflected navigation signals which are received via reflected signal paths from a signal reflector, such as a substantially isotropic reflector. A position of the signal reflector can then be resolved from the reflector range measurements at the GPS-enabled receiver.

In other embodiments of user equipment navigation solution with position determination of a navigation signal reflector, the reflected navigation signals can be isolated to negate negative effects of the reflected navigation signals when determining the receiver range measurements to resolve the navigation solution of the GPS-enabled receiver. The reflected navigation signals can be isolated from the direct navigation signals which are received before the reflected navigation signals, where a reflected navigation signal and a corresponding direct navigation signal both include an identifiable code signal transmitted by a GPS platform. The direct navigation signals can be isolated from the reflected navigation signals which are each delayed by a same duration of time relative to a corresponding direct navigation signal when reflected from the substantially isotropic reflector. Further, the direct navigation signals can be isolated from the reflected navigation signals utilizing an adaptive gain control and acquisition search algorithm to detect the reflected navigation signals which each have different signal strengths than a corresponding direct navigation signal.

The disclosure may be applicable to any Global Navigation Satellite System (GNSS) or Global Positioning System (GPS) platform, or to any GNSS/GPS payload platform. The platform can include any type of aircraft, satellite, airborne system, pseudo-lite systems, or airborne device that incorporates a GNSS/GPS system to transmit GNSS/GPS positioning signals.

BRIEF DESCRIPTION OF THE DRAWINGS

Embodiments of the disclosure are described with reference to the following drawings. The same numbers are used throughout the drawings to reference like features and components.

DETAILED DESCRIPTION

User equipment navigation solution with position determination of a navigation signal reflector is described in which embodiments provide for determining both a navigation solution of a GPS-enabled receiver (also referred to as "user equipment") and a position of a substantially isotropic reflector that reflects GPS navigation signals. A GPS-enabled receiver at one location can determine the position of the navigation signal reflector that is at a different location than the GPS-enabled receiver. The GPS-enabled receiver can search for, acquire, and determine separate pseudo-range measurements for direct path navigation signals and for reflected path navigation signals, and use the measurements to generate two separate position solutions. A navigation solution can be generated for the GPS-enabled receiver as determined from the direct path navigation signals, and a position solution can be generated for the location of the navigation signal reflector as determined from the reflected navigation signals.

Navigation signals transmitted from global positioning system (GPS) platform(s) can be received at the GPS-enabled receiver as direct navigation signals and as reflected navigation signals that are reflected from the navigation signal reflector. Receiver range measurements can be determined from the direct navigation signals which are received via direct signal paths from the GPS platform(s), and a navigation solution of the GPS-enabled receiver can then be resolved from the receiver range measurements. Similarly, reflector range measurements can be determined from the reflected navigation signals which are received via reflected signal paths from the navigation signal reflector, such as a substantially isotropic reflector. A position of the navigation signal reflector can then be resolved from the reflector range measurements at the GPS-enabled receiver.

The direct path navigation signals can be isolated from the reflected path navigation signals from the substantially isotropic reflector so that the position of the reflector can be determined as a by-product of conventional user equipment PVT navigation solution determination. In addition, since the reflected path navigation signals are isolated and eliminated from the direct path navigation signals, the user equipment PVT solution can be used with a much higher level of confidence. For example, consistent solutions for both the receiver location and the reflector location, where consistency can be confirmed using a Receiver Autonomous Integrity Monitoring (RAIM) algorithm, verifies that the direct path signals and reflected path signals were correctly isolated, as well as the hypothesis of the existence of the isotropic reflector.

While features and concepts of the described systems and methods for user equipment navigation solution with position determination of a navigation signal reflector can be implemented in any number of different environments, systems, and/or configurations, embodiments of user equipment navigation solution with position determination of a navigation signal reflector are described in the context of the following example environment and system architectures.

Figure 1:
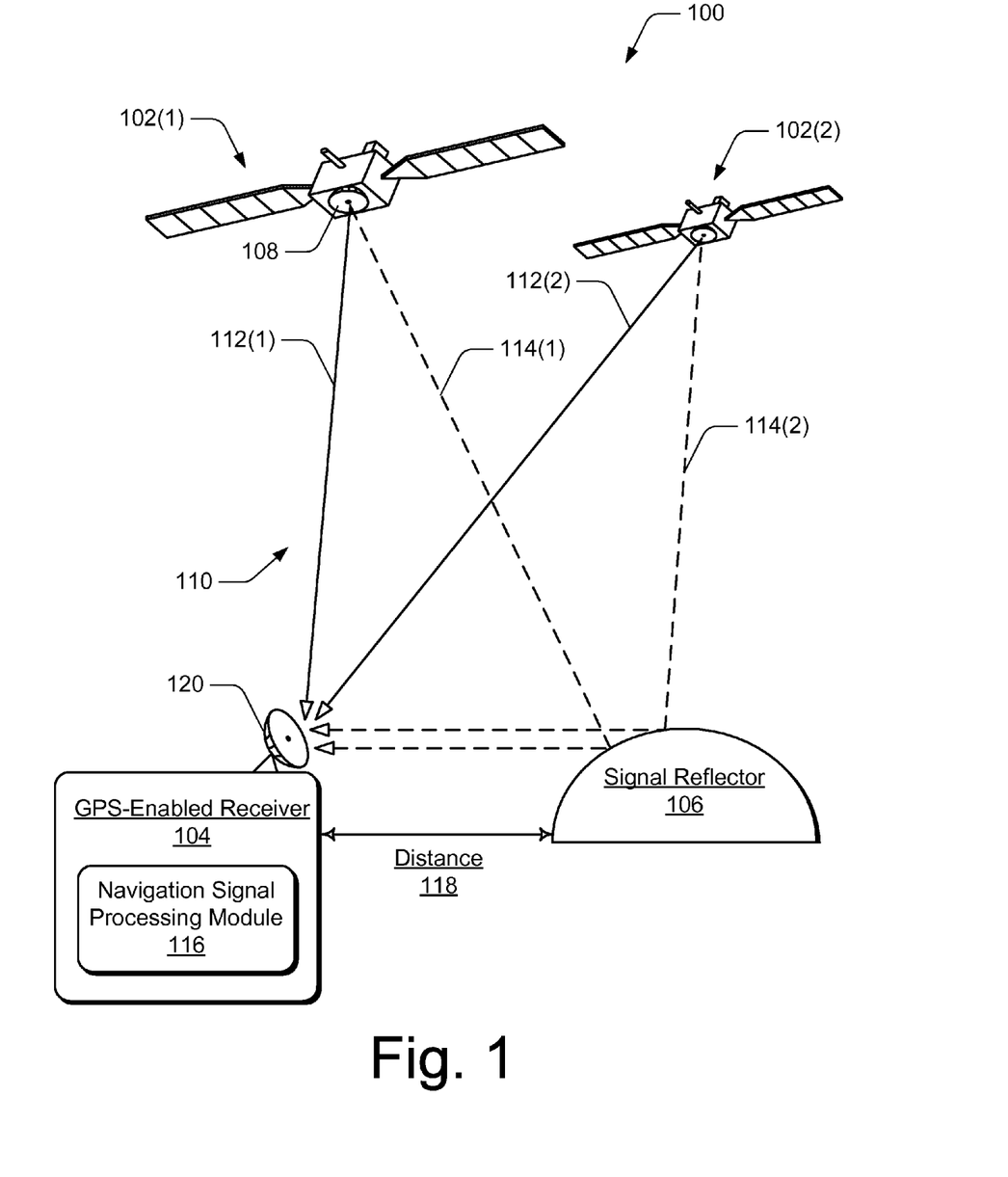
FIG. 1 illustrates an example environment in an embodiment of the disclosure.

FIG. 1 illustrates an example environment 100 in which embodiments of user equipment navigation solution with position determination of a navigation signal reflector can be implemented. The environment 100 can include any number of Global Positioning System (GPS) satellite platforms 102 (1-2) (or other platforms such as an airborne system, a pseudo-lite system, or airborne device) that transmit navigation signals. The environment 100 can also include any number of user platforms, such as a satellite, an aircraft, and/or any other type of GPS-enabled device or system that receives the transmitted navigation signals. Although only two GPS-platforms 102 are shown in this example, the environment 100 can include any number of GPS-platforms that transmit GPS navigation signals.

The environment 100 also includes a GPS-enabled receiver 104, such as any type of mobile ground-based or airborne receiver, and includes a GPS navigation signal reflector 106, such as the substantially isotropic reflector shown in this example. The substantially isotropic reflector 106 has at least the characteristic of reflecting all GPS navigation signals almost equally in all directions. Additionally, the isotropic reflector 106 may be any number of navigation signal reflectors that are positioned to form a substantially isotropic reflector when combined.

In this example, the GPS platforms 102(1-2) are depicted as GPS satellites which each include a wide beam antenna 108 (also referred to as an "Earth coverage antenna") that transmits GPS positioning information and navigation signals to the GPS-enabled receiver 104. A GPS-platform 102 and the GPS-enabled receiver 104 can each be implemented with any number and combination of differing components as further described below with reference to the example computing-based device shown in FIG. 4. For example, the GPS-enabled receiver 104 can be implemented as computing-based device that includes any one or combination of the components described with reference to the example computing-based device shown in FIG. 4.

The GPS-enabled receiver 104 can receive navigation signals 110 that are transmitted, or communicated, from any one or more of the GPS-platforms 102(1-2). The GPS-enabled receiver 104 can receive the navigation signals 110 as direct navigation signals 112(1-2) that are received via direct signal paths from the GPS-platform(s) 102. The GPS-enabled receiver 104 can also receive reflected navigation signals 114(1-2) that are received via reflected signal paths from the navigation signal reflector 106. The GPS-enabled receiver 104 can then determine or resolve a position of the GPS-enabled receiver 104 from the direct navigation signals 112, and determine or resolve a position of the navigation signal reflector 106 from the reflected navigation signals 114.

The GPS-enabled receiver 104 can include a navigation signal processing module 116 to process the received navigation signals 110 and to implement embodiment(s) of user equipment navigation solution with position determination of a navigation signal reflector. The navigation signal processing module 116 can process the navigation signals 110 to isolate and negate negative effects of the reflected navigation signals 114 when the position of the GPS-enabled receiver is resolved. Further, the position of the signal reflector 106 can be resolved at the GPS-enabled receiver 104 such that the signal reflector 106 can be eliminated or removed.

The navigation signal processing module 116 can isolate the reflected navigation signals 114 from the direct navigation signals 112. For example, a direct navigation signal 112(1) travels in a direct signal path and is received at the GPS-enabled receiver 104 before the corresponding reflected navigation signal 114(1), but can be correlated because both include an identifiable code signal synchronized to GPS satellite time when generated by the GPS platform 102(1). The GPS-enabled receiver 104 can implement an early-to-late acquisition search to detect a pseudorandom noise code signal of the direct navigation signal 112(1-2) before detecting the corresponding pseudorandom noise code signal of the reflected navigation signal 114(1-2), respectively.

More generally than the early-to-late search approach, the GPS-enabled receiver 104 can implement an acquisition search technique that covers sufficient range space to detect both the direct navigation signals 112 and the reflected navigation signals 114 for each of the GPS-platforms 102. In the case of an isotropic reflector (such as signal reflector 106), the reflected navigation signals 114 are each delayed by the same duration of time relative to a corresponding direct navigation signal 112 when reflected from the isotropic reflector 106. The reflected navigation signals 114 from the navigation signal reflector 106 will all be delayed by the same amount of time relative to the signal phase incident at the reflector. The GPS-enabled receiver 104 can search for and isolate the direct navigation signals 112 from the reflected navigation signals 114 based on this characteristic associated with the signal reflector 106.

Further, a reflected navigation signal 114(1) can be identified as having a different signal strength than a corresponding direct navigation signal 112(1). An adaptive gain control and acquisition search algorithm can be implemented at the GPS-enabled receiver 104 to facilitate the detection and isolation of signals having different power levels. The received direct path navigation signals 112(1-2) are nominally the same power level, when adjusting for differences in transmitter power, ranges to the satellites, and receiver antenna gain pattern, etc. On the other hand, the received power levels of the reflected navigation signals 124(1-2) can be significantly different than that of the corresponding direct path navigation signals, and this information can be used to further isolate a signal detection as belonging to one or the other set of navigation signals (i.e., a reflected navigation signal 114 or a direct navigation signal 112).

The GPS-enabled receiver 104 can be implemented to generate (also compute or determine) two navigation position solutions, where a navigation solution is generated for the GPS-enabled receiver 104 as determined from the direct path navigation signals 112, and a position solution is generated for the location of the signal reflector 106 as determined from the reflected navigation signals 114. The navigation signal processing module 116 can be implemented to determine receiver range measurements from the direct navigation signals 112, and resolve the position of the GPS-enabled receiver 104 utilizing the receiver range measurements. The navigation signal processing module 116 can also be implemented to determine reflector range measurements from the reflected navigation signals 114, and resolve the position of the signal reflector 106 utilizing the reflected range measurements.

Because the signal reflector 106 is at a distance 118 (identified herein as distance d) from an antenna 120 of the GPS-enabled receiver 104, all of the pseudorandom noise code phase epochs of the reflected navigation signals 114 received at the GPS-enabled receiver 104 will be delayed by an amount $\tau=d/c$, relative to the code phase epochs incident at the signal reflector, where c is the speed of light. Relative to the GPS-enabled receiver 104, the reflected navigation signals 114 will be delayed by an amount equal to the differential path length of the reflected navigation signals 114 relative to the path length associated with the direct navigation signals 112.

For example, the reflected code phase of pseudorandom noise for the reflected navigation signal 114(1) from the GPS-platform 102(1) will be delayed relative to the direct navigation signal 112(1) by an amount equal to:

$$\{(Path_{reflector}+d)-Path_{direct}\}/c$$

If the reflected navigation signal 114(1) arrives at the GPS-enabled receiver 104 at nearly the same line-of-sight angle as the direct navigation signal 114(1), the delay may be small relative to a pseudorandom noise code chip, and may even be less than one pseudorandom noise code chip. For an L1 C/A code, the pseudorandom noise code chip is three-hundred (300) meters, and for a P(Y) code, the pseudorandom noise code chip is thirty (30) meters.

The Pseudo-Range (PR) equation for each of the direct path navigation signals 112 to the GPS-enabled receiver 104 is given by:

$$PR_{Rcvr}=R_{Rcvr}+c\cdot b, \text{ where}$$

$PR_{Rcvr}$ is the pseudo-range for the GPS-enabled receiver 104; $R_{Rcvr}$ is the true range between the GPS-platform 102 and the GPS-enabled receiver 104; c is the speed of light; and b is the receiver clock bias. The above equation neglects other smaller range delay effects that, in alternate embodiment(s), can be taken into consideration when determining the pseudo-range equation for each of the direct path navigation signals 112.

The Pseudo-Range (PR) equation as measured at the GPS-enabled receiver 104 for each of the reflected path navigation signals 114 is given by:

$$PR_{SR}=R_{SR}+c\cdot(b+\tau), \text{ where}$$

$PR_{SR}$ is the pseudo-range for the signal reflector 106; $R_{SR}$ is the true range between the GPS-platform 102 and the signal reflector 106; c is the speed of light; b is the receiver clock bias; and $\tau$ is the delay associated with the distance 118 between the signal reflector 106 and the GPS-enabled receiver 104.

The range can be modeled by the equation:

$$R^2=(x_s-x)^2+(y_s-y)^2+(z_s-z)^2, \text{ where}$$

$(x_s, y_s, z_s)$ is the position of the satellite (e.g., GPS-platform 102). To determine the range for the GPS-enabled receiver 104, the (x,y,z) in the range equation corresponds to the location of the GPS-enabled receiver 104. To determine the range for the signal reflector 106, the (x,y,z) in the range equation corresponds to the location of the signal reflector 106. Given pseudo-range measurements for direct navigation signals 112 from several GPS-platforms 102 (such as four or more in one embodiment), a navigation algorithm can be implemented to resolve the location of the GPS-enabled receiver 104 and solve for the GPS-enabled receiver clock bias h. Similarly, given pseudo-range measurements for reflected navigation signals 114 from the several GPS-platforms 102, the navigation algorithm can be implemented to resolve the location of the signal reflector 106 and solve for the GPS-enabled receiver clock bias b plus the delay $\tau$ (i.e., (b+$\tau$) in the pseudo-range equation $PR_{SR}$ for the signal reflector 106.

Figure 2:
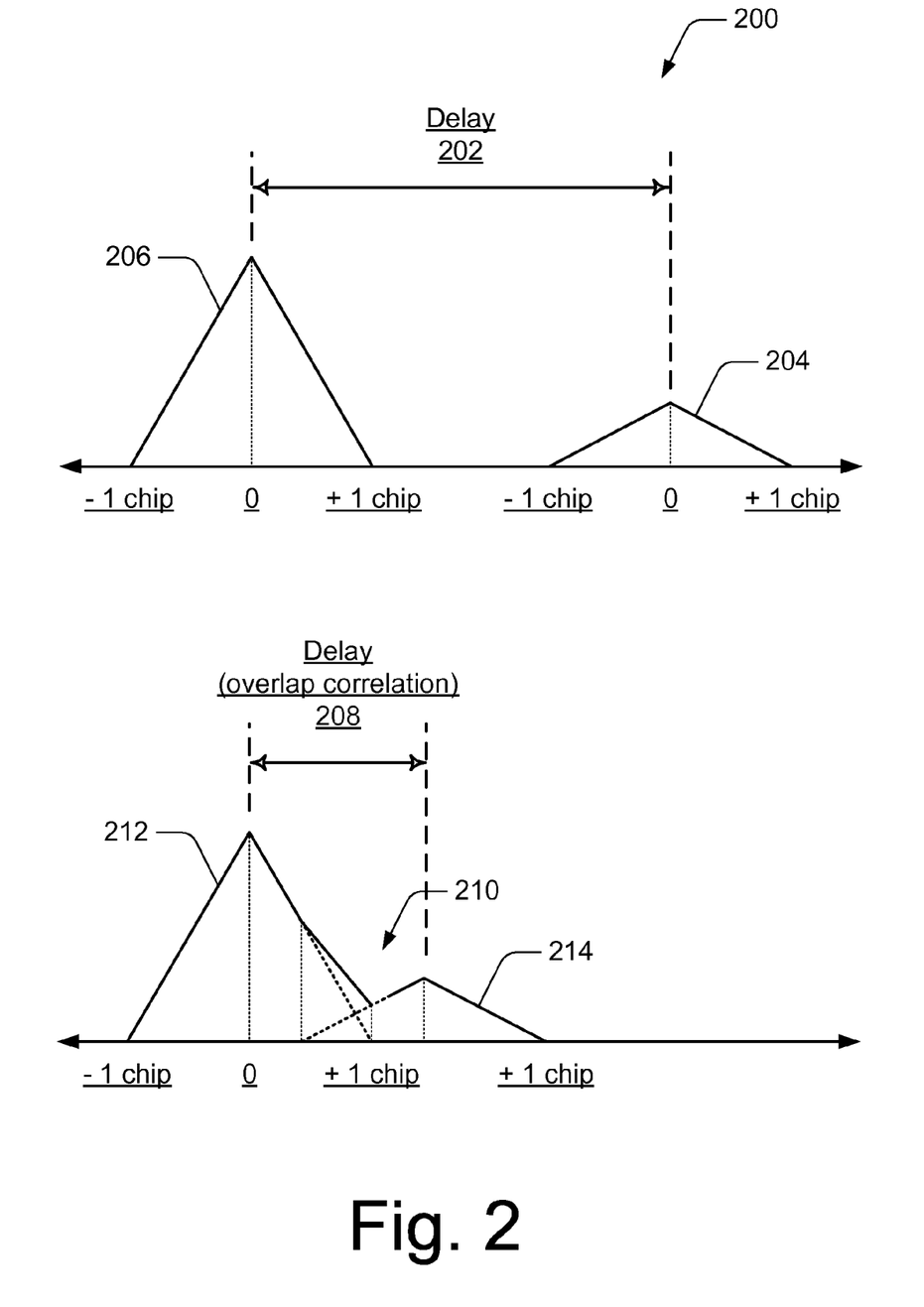
FIG. 2 illustrates examples of an autocorrelation function for pseudorandom noise (PRN) code signals for user equipment navigation solution with position determination of a navigation signal reflector.

FIG. 2 illustrates examples 200 of an autocorrelation function of pseudorandom noise (PRN) code signals in embodiment(s) for user equipment navigation solution with position determination of a navigation signal reflector. The examples 200 show correlation functions associated with pseudorandom noise code signals for direct path navigation signals 112 and reflected path navigation signals 114. In this example, the autocorrelation function associated with the reflected path navigation signal 114 is shown with smaller peak amplitude or power than the autocorrelation function of the direct path navigation signal 112. If the delay 202 is at least two pseudorandom noise code chips, then the reflected signal autocorrelation function 204 will be isolated from the direct signal autocorrelation function 206. However, if the delay is less than two chips (i.e., delay 208 with overlap correlations), then the autocorrelation function will consist of a composite 210 of the direct path signal 212 and the reflected path signal 214 such that identification and isolation of the reflected path signal 214 at the GPS-enabled receiver 104 can be more difficult.

The GPS-enabled receiver 104 can implement tracking loops for early-to-late correlator spacing of one chip or less, and if the delay is more than 1.5 chips, then the reflected path signal will have negligible effect on the GPS-enabled receiver pseudorandom noise code tracking loop. However, during a satellite navigation signal acquisition phase, reflected navigation signals with delays of more than two chips, as shown in the upper diagram of FIG. 2, can cause the GPS-enabled receiver 104 to lock on to the reflected path signal instead of the direct path signal and use ranging measurements derived from tracking the reflected path signal to compute navigation solutions. In addition, if the delay is less than two chips, the reflected path signal is no longer completely isolated from the direct path signal, and a composite autocorrelation function 210 then represents both the direct path signal 212 plus the reflected path signal 214, as shown in the lower diagram of FIG. 2. The resulting distortion of the autocorrelation function can introduce error into the pseudo-range measurement.

When the reflected path signal delay 202 is larger than two chips, the autocorrelation functions of the two pseudorandom noise code signals 204, 206 can be isolated and identified as the two separate signals utilizing an acquisition algorithm which searches over sufficient range space uncertainty, and controls detection parameters to detect both the direct path and reflected path signals. In an event that the delay for a reflected path signal is less than two chips, an algorithm can be implemented at the GPS-enabled receiver 104 to control the correlator offsets, detection, and search parameters (e.g., integration time) to search smaller chip offsets.

The smaller chip offsets can be utilized to verify that the reflected path signal is less than two chips, further characterize the shape of the composite autocorrelation function 210, and provide an estimate of the direct signal time epoch associated with the earliest peak 212 and the reflected path signal delay associated with the later peak 214. Alternatively, the two time epochs can be determined based on estimates of where the composite autocorrelation function 210 changes slope, or using maximum likelihood estimation (MLE) techniques that model both the direct and reflected path autocorrelation functions. The time epochs associated with the peaks of the correlation functions can then be used to generate the pseudo-range measurements for each of the pseudorandom noise code signals for both the direct path signals and reflected path signals.

In an event that the number of detected direct path pseudorandom noise code signals is different from the number of detected reflected path pseudorandom noise code signals, such as when the line-of-sight for a direct path signal is completely blocked and not received at the GPS-enabled receiver 104, an algorithm, such as a Receiver Autonomous Integrity Monitoring (RAIM) algorithm, can be implemented to verify that the sets of pseudo-range measurements for the direct path and reflected path signals have been correctly selected, or to isolate or exclude one or more of the pseudo-range measurements as having been incorrectly selected as belonging to the wrong set of direct path and/or reflected path signals. Although FIG. 2 illustrates specific examples of an autocorrelation function of PRN code signals, embodiments of user equipment navigation solution with position determination of a navigation signal reflector can furthermore be generalized to accommodate environments which include traditional multi-path reflections from non-isotropic reflectors, or multi-path reflections from multiple isotropic reflectors.

Generally, any of the functions, methods, and modules described herein can be implemented using hardware, software, firmware (e.g., fixed logic circuitry), manual processing, or any combination thereof. A software implementation of a function, method, or module represents program code that performs specified tasks when executed by a computing-based processor. Example method 300 described with reference to FIG. 3 may be described in the general context of computer executable instructions. Generally, computer executable instructions can include applications, routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices. Further, the features described herein are platform-independent such that the techniques may be implemented on a variety of computing platforms having a variety of processors.

Figure 3:
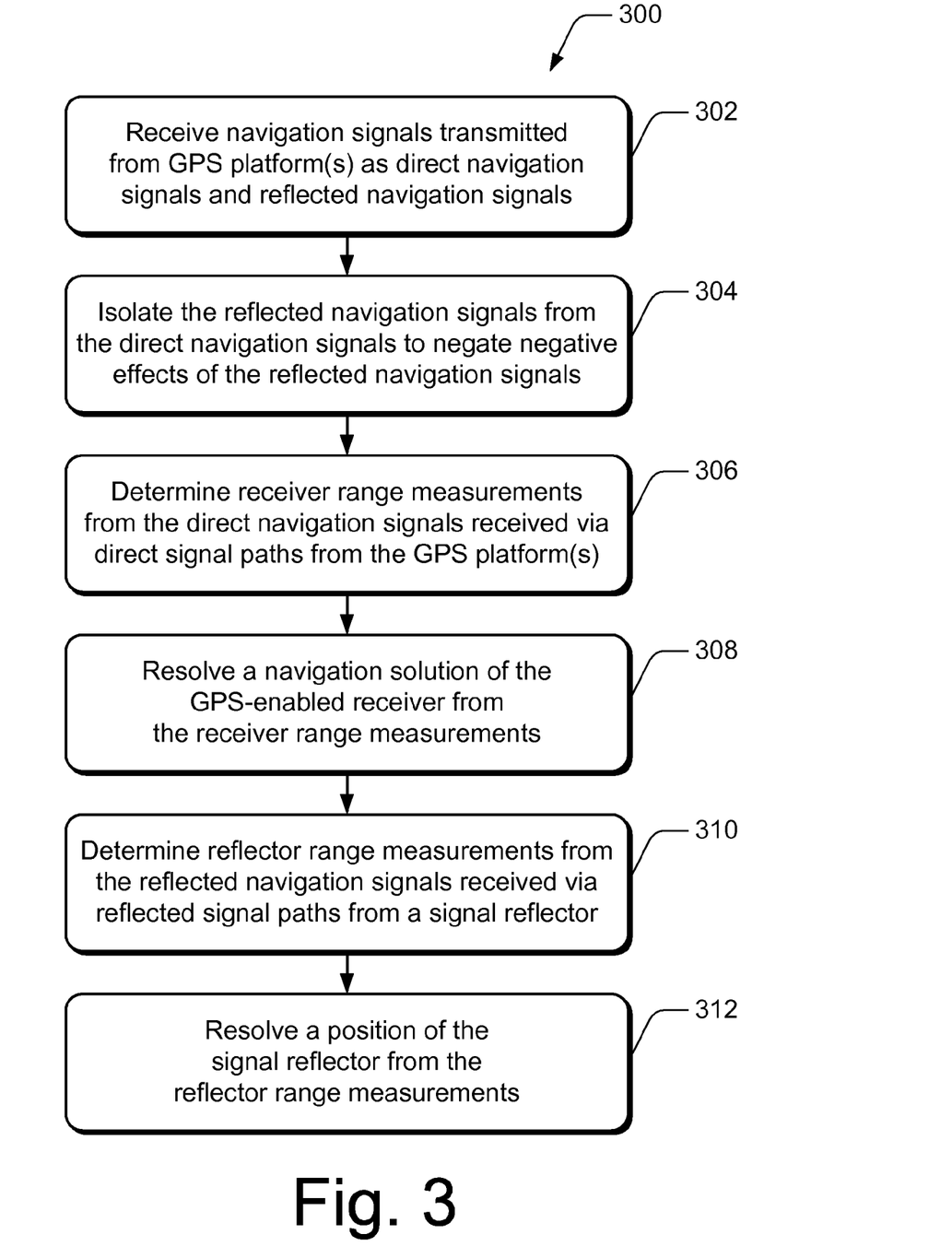
FIG. 3 illustrates example method(s) for user equipment navigation solution with position determination of a navigation signal reflector.

FIG. 3 illustrates example method(s) 300 for user equipment navigation solution with position determination of a navigation signal reflector and is described with reference to the example environment shown in FIG. 1. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 302, navigation signals transmitted from global positioning system (GPS) platform(s) are received as direct navigation signals and reflected navigation signals. For example, the GPS-enabled receiver 104 receives the direct navigation signals 112 transmitted from any number of GPS platforms 102 via direct signal paths. The GPS-enabled receiver 104 also receives the reflected navigation signals 114 transmitted from the GPS platforms 102 via reflected signal paths from the signal reflector 106, which in one embodiment, is a substantially isotropic reflector.

At block 304, the reflected navigation signals are isolated from the direct navigation signals to negate negative effects of the reflected navigation signals. The direct navigation signals 112 can be isolated when received before the reflected navigation signals 114, where a reflected navigation signal 114(1) and a corresponding direct navigation signal 112(1) both include an identifiable code signal transmitted by the GPS platform 102(1). The reflected navigation signals 114 can also be isolated when identifying that each of the reflected navigation signals 114 are delayed by a same duration of time relative to a corresponding direct navigation signal 112 when reflected from the signal reflector 106 (e.g., an isotropic reflector, or a group of reflectors that together form a substantially isotropic reflector). The direct navigation signals 112 can also be isolated utilizing an adaptive gain control and acquisition search algorithm to detect the reflected navigation signals 114 which each have different signal strengths than a corresponding direct navigation signal 112. The above time delay and signal strength discrimination information is also used to group the signal detections as belonging to either the set of direct path navigation signals, the set of reflected path navigation signals, or neither.

At block 306, receiver range measurements are determined from the direct navigation signals received via direct signal paths from the GPS platform(s). For example, the navigation signal processing module 116 at the GPS-enabled receiver 104 is implemented to determine receiver range measurements from the direct navigation signals 112. The negative effects of the reflected navigation signals 114 are negated (by isolating at block 304) when determining the receiver range measurements to resolve the navigation solution of the GPS-enabled receiver 104.

At block 308, a navigation solution of the GPS-enabled receiver is resolved from the receiver range measurements. For example, the navigation signal processing module 116 determines the location or position of the GPS-enabled receiver 104 from the receiver range measurements corresponding to the direct path navigation signals.

At block 310, reflector range measurements are determined from the reflected navigation signals received via reflected signal paths from the signal reflector. For example, the navigation signal processing module 116 at the GPS-enabled receiver 104 is implemented to determine reflector range measurements from the reflected navigation signals 114. At block 312, a position of the signal reflector is resolved from the reflector range measurements. For example, the navigation signal processing module 116 determines the location or position of the substantially isotropic signal reflector 106 from the reflector range measurements corresponding to the reflected path navigation signals. The position of the substantially isotropic reflector 106 is resolved at the GPS-enabled receiver 104 such that effects of the isotropic reflector can be eliminated or removed.

Figure 4:
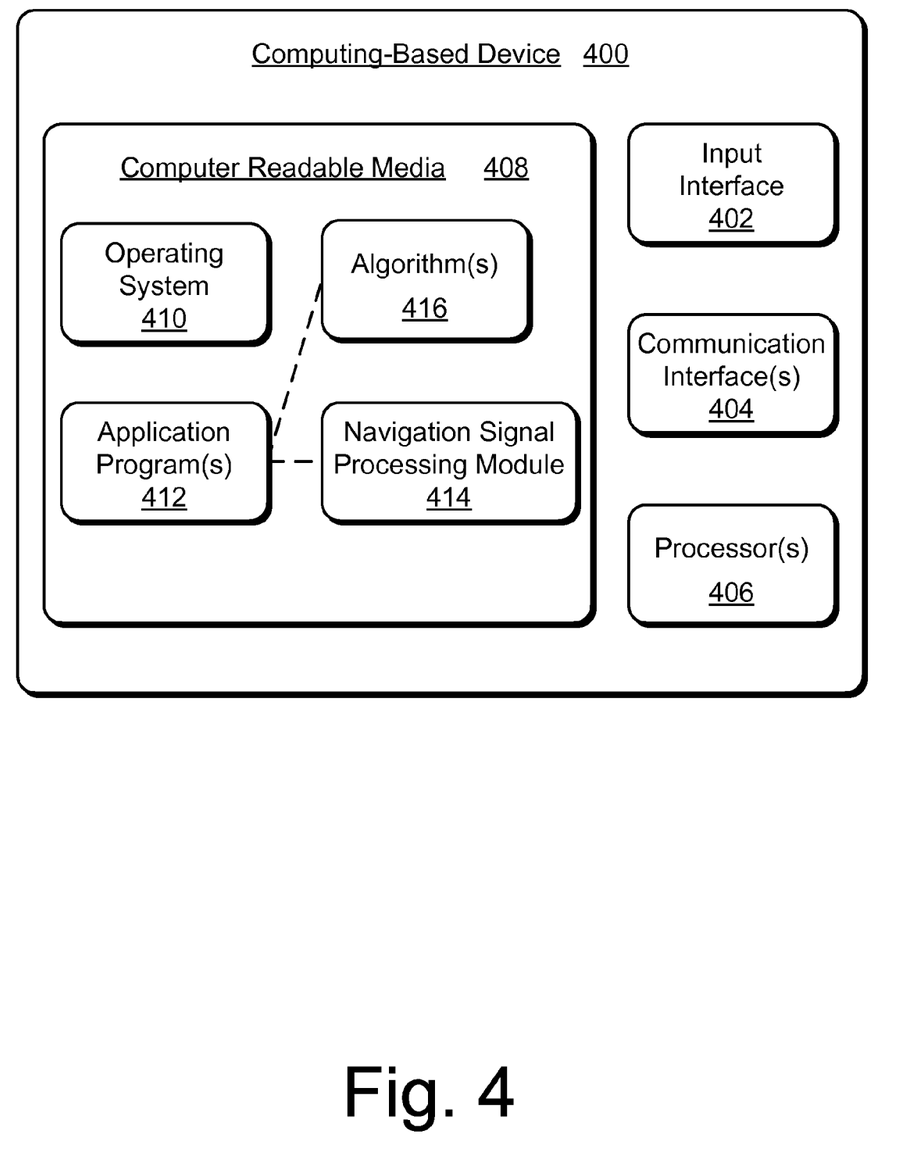
FIG. 4 illustrates various components of an example computing-based device in which embodiments of user equipment navigation solution with position determination of a navigation signal reflector can be implemented.

FIG. 4 illustrates various components of an example computing-based device 400 which can be implemented as any form of computing or electronic device in which embodiments of user equipment navigation solution with position determination of a navigation signal reflector can be implemented. For example, the computing-based device 400 can be implemented to include any one or combination of components described with reference to the example environment shown in FIG. 1, such as the GPS-enabled receiver 104.

The computing-based device 400 includes an input interface 402 by which any type of data inputs can be received, such as from any airborne system components, sensors, systems, and/or subsystems. Device 400 further includes communication interface(s) 404 which can be implemented as any one or more of a serial and/or parallel interface, a wireless interface, any type of network interface, and as any other type of communication interface for external communication.

The computing-based device 400 also includes one or more processors 406 (e.g., any of microprocessors, controllers, and the like) which process various computer executable instructions to control the operation of computing-based device 400, to communicate with other electronic and computing devices, and to implement embodiments of user equipment navigation solution with position determination of a navigation signal reflector. Computing-based device 400 can also be implemented with computer readable media 408, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 408 provides data storage mechanisms to store various information and/or data such as software applications and any other types of information and data related to operational aspects of computing-based device 400. For example, an operating system 410 and/or other application programs 412 can be maintained as software applications with the computer readable media 408 and executed on processor(s) 406 to implement embodiments of user equipment navigation solution with position determination of a navigation signal reflector. As an application program, a navigation signal processing module 414 and/or various algorithm(s) 416 can be implemented as software applications to implement embodiments of user equipment navigation solution with position determination of a navigation signal reflector. Although the navigation signal processing module 414 is described as a single application, the navigation signal processing module 414 can be implemented as several component modules or applications distributed to each perform one or more functions of user equipment navigation solution with position determination of a navigation signal reflector. Additionally, the navigation signal processing module 414 can include the various algorithm(s) 416.

The navigation signal processing module 414 is an example of the navigation signal processing module 116 implemented in the GPS-enabled receiver 104 to mitigate multipath from an isotropic reflector using a two solution method. The navigation signal processing module 414 enables searching for, detecting, isolating, and processing the direct navigation signals 112 and the reflected navigation signals 114. The navigation signal processing module 414 also solves for and validates the navigation solution for the GPS-enabled receiver 104, and solves for and validates the determined location of the signal reflector 106.

The navigation signal processing module 414 and/or an algorithm 416 controls the processing logic and relevant parameters to enable acquisition search and detection of both the direct navigation signals 112 and the reflected navigation signals 114, such as by acquisition range space control, adaptive gain control to facilitate detection of weak and strong signals, integration time and detection parameters, and control to handle the situations of the reflected signal causing either in-chip versus out-of-chip autocorrelation function characteristics. For each predicted pseudorandom noise (PRN) code signal that is detected, the GPS-enabled receiver 104 searches for the direct navigation signal from a GPS-platform 102 using an acquisition search algorithm that searches over sufficient range space to detect both the direct path navigation signal and reflected path navigation signal for each pseudorandom noise code signal (e.g., an early-to-late acquisition search approach over the time-position and frequency domain uncertainty region).

The navigation signal processing module 414 isolates the direct path navigation signal that is associated with the earliest (relative to time) detection from the delayed reflected path navigation signal due to the later detection. The navigation signal processing module 414 also searches for within-chip reflections when a separate autocorrelation function peak is not determined for a reflected path navigation signal pseudorandom noise code signal. The navigation signal processing module 414 can then generate the pseudo-range measurements for the direct path navigation signals and the reflected path navigation signals for each pseudorandom noise code signal. The navigation signal processing module 414 can also be implemented to process and compare measured signal power and estimated signal power as an additional discriminant by which to isolate and/or validate the set assignment of a signal detection or corresponding pseudo-range measurement. The navigation signal processing module 414 can then compute a navigation solution for the location of the GPS-enabled receiver 104, and compute a position solution for the location of the signal reflector 106.

Although embodiments of user equipment navigation solution with position determination of a navigation signal reflector have been described in language specific to structural features and/or methods, it is to be understood that the subject of the appended claims is not necessarily limited to the specific features or methods described. Rather, the specific features and methods are disclosed as example implementations of user equipment navigation solution with position determination of a navigation signal reflector.

The invention claimed is:

1. A method of resolving a navigation solution of a global positioning system (GPS) enabled receiver, the method comprising:
   receiving direct navigation signals transmitted from one or more GPS platforms;
   determining receiver range measurements from the direct navigation signals received via direct signal paths from the one or more GPS platforms;
   resolving a navigation solution of the GPS-enabled receiver from the receiver range measurements to determine a position of the GPS-enabled receiver;
   determining reflector range measurements from the reflected navigation signals received via reflected signal paths from isotropic reflector; and
   resolving a longitudinal, lateral, and vertical position of the isotropic reflector from the reflector range measurements.

2. A method as recited in claim 1, further comprising isolating the reflected navigation signals to negate negative effects of the reflected navigation signals when determining the receiver range measurements to resolve the navigation solution of the GPS enabled receiver.

3. A method as recited in claim 1, further comprising isolating the reflected navigation signals from the direct navigation signals which are received before the reflected navigation signals, a reflected navigation signal and a corresponding direct navigation signal both including an identifiable code signal transmitted by a GPS platform.

4. A method as recited in claim 1, further comprising eliminating the effects of the isotropic reflector on the navigation solution by physically removing or relocating the isotropic reflector.

5. A method as recited in claim 1, further comprising isolating the direct navigation signals from the reflected navigation signals utilizing an adaptive gain control and acquisition search algorithm to detect the reflected navigation signals which each have a different signal strength than a corresponding direct navigation signal.

6. A global positioning system (GPS), comprising:
   a GPS enabled receiver to:
      receive direct navigation signals transmitted from one or more GPS platforms; and
      receive reflected navigation signals transmitted from the one or more GPS platforms; and
   a navigation signal processing module to:
      isolate the direct navigation signals from the reflected navigation signals;
      determine receiver range measurements from the isolated direct navigation signals to resolve a navigation solution of the GPS-enabled receiver; and
      determine reflector range measurements from the isolated reflected navigation signals to resolve a position of a signal reflector, the reflected navigation signals received via reflected signal paths from the signal reflector.

7. A global positioning system as recited in claim 6, wherein the isolate the direct navigation signals from the reflected navigation signals is operable to isolate the reflected navigation signals from the direct navigation signals which are received before the reflected navigation signals, a reflected navigation signal and a corresponding direct navigation signal both including an identifiable code signal transmitted by a GPS platform 8. A global positioning system as recited in claim 6, wherein the signal reflector is a substantially isotropic reflector, and wherein the reflected navigation signals are received from the one or more GPS platforms via the reflected signal paths from the substantially isotropic reflector.

9. A global positioning system as recited in claim 8, wherein the position of the substantially isotropic reflector is resolved at the GPS enable receiver such that the isotropic reflector can be eliminated.

10. A global positioning system as recited in claim 8, wherein the isolate the direct navigation signals from the reflected navigation signals is operable to isolate the direct navigation signals from the reflected navigation signals which are each delayed by a same duration of time relative to a corresponding direct navigation signal when reflected from the substantially isotropic reflector.

11. A global positioning system as recited in claim 8, wherein the isolate the direct navigation signals from the reflected navigation signals is operable to isolate the direct navigation signals from the reflected navigation signals utilizing an adaptive gain control and acquisition search algorithm to detect the reflected navigation signals which each have a different signal strength than a corresponding direct navigation signal.

12. One or more computer readable media comprising encoded computer executable instructions that, when executed, direct a GPS enabled receiver to:
   receive a first set of navigation signals transmitted from one or more global positioning system (GPS) platforms:
   receive a second set of navigation signals transmitted from the one or more GPS platforms and reflected from a substantially isotropic reflector positioned at an unknown location;
   resolve a navigation solution of the GPS enabled receiver from the direct navigation signals that are received via direct signal paths from the one or more GPS platforms to determine a location of the GPS-enabled receiver; and
   resolve a position of a substantially isotropic reflector from the received reflected navigation signals.

13. One or more computer readable media as recited in claim 12, further comprising encoded computer executable instructions that, when executed, direct the GPS enabled receiver to isolate the second set of navigation signals from the first set of navigation signals which are received before the second set of navigation signals, a first navigation signal and a corresponding second navigation signal both including an identifiable code signal transmitted by a GPS platform.

14. One or more computer readable media as recited in claim 12, further comprising encoded computer executable instructions that, when executed, direct the GPS enabled receiver to isolate the first set of navigation signals from the second set of navigation signals which are each delayed by a same duration of time relative to a corresponding first navigation signal when reflected from the substantially isotropic reflector.

15. One or more computer readable media as recited in claim 12, further comprising encoded computer executable instructions that, when executed, direct the GPS enabled receiver to isolate the first set of navigation signals from the second set of navigation signals which each have a different signal strength than a corresponding first navigation signal.

16. The method of claim 1, wherein the reflector range measurements are determined according to the equation $PR_{SR}=R_{SR}+c\cdot(b+\tau)$, where $PR_{SR}$ is the pseudo-range for the reflector; $R_{SR}$ is the true range between a GPS-platform and the reflector; c is the speed of light; b is a clock bias of the GPS-enabled receiver; and $\tau$ is the delay associated with a distance between the reflector and the GPS-enabled receiver; and wherein the position of the reflector is resolved according to the equation $R^2=(x_s-x)^2+(y_s-y)^2+(z_s-z)^2$, where R is the true range of the reflector relative to the GPS-enabled receiver, $(x_s, y_s, z_s)$ is the position of the GPS-platform, and (x,y,z) is the position of the reflector.

* * * * *